United States Patent Office 2,924,587
Patented Feb. 9, 1960

2,924,587

POLYISOCYANATE-HYDROXY ALIPHATIC HYDROCARBON SUBSTITUTED SILOXANE COATING COMPOSITION

Leonard M. Shorr, Pittsburgh, Pa., assignor to Dow Corning Corporation, Midland, Mich., a corporation of Michigan No Drawing. Application March 7, 1955
Serial No. 492,732

10 Claims. (Cl. 260—46.5)

This invention relates to a method of applying organosilicon compounds to organic fibrous materials and to some of the compositions so applied.

It has long been known that organosilicon compounds produce water repellent surfaces when applied to practically any material. They have met with oustanding success with respect to textiles particularly wool and synthetic textiles. Heretofore employed organosilicon compositions also render cotton and other cellulosic fibers water repellent. However, after 1 or 2 launderings the water repellent film is completely removed. This phenomenom is presumably due to the much more drastic treatment to which cotton is subjected during laundering than are other types of fabric. As a consequence of this defect heretofore employed organosilicon water repellents have not met with much success in the treatment of cotton.

Another defect which has been inherent in heretofore employed silicone coating compositions has been the deterioration of the coating when subjected to hydrocarbon solvents. This defect is overcome with certain of the compositions employed in the method of this invention.

It is the object of this invention to provide a method of rendering organic fibrous materials water repellent. Another object is to provide a durable water repellent treatment for cellulosic fabrics. Another object is to provide improved coating compositions which are resistant to hydrocarbon solvents. Other objects and advantages will become apparent from the following description.

In accordance with this invention a composition of from 1 to 50 mol percent

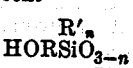

and from 50 to 99 mol percent

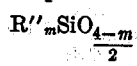

in which R is a divalent saturated aliphatic hydrocarbon radical or a divalent saturated cycloaliphatic hydrocarbon radical in all of which the hydroxyl is attached to at least the third carbon atom away from the silicon, R′ is a monovalent hydrocarbon radical or a halogenated monovalent hydrocarbon radical both being free of aliphatic unsaturation, n has a value from 0 to 2 inclusive, R″ is a monovalent hydrocarbon, halogenated monovalent hydrocarbon radical or hydrogen, and m has an average value from 1 to 3 inclusive, said composition being in liquid form is mixed with a polyisocyanate and applied to an organic fibrous material and thereafter allowed to dry. The above limitation to the effect that the hydroxyl is attached to at least the third carbon atom away from the silicon means that the hydroxyl is no closer than the third carbon from the silicon atom.

The compositions above described may be applied to the organic fibrous material in any desired manner, for example, the material may be dipped in the coating composition or the coating composition may be brushed, sprayed or flooded on the fibrous material. The coating composition may be in the form of a solution but if solvents are employed, they should be free of active hydrogen so as not to interfere with the isocyanate cure.

The term "organic fibrous material" includes such materials as cotton, rayon, ramie, nylon, silk, polyester fibers, wool, linen, paper, wood and leather. Preferably the amount of isocyanate employed is in excess of that required to react with all of the HOR groups in the siloxane. It is believed that the excess isocyanate groups react with any active groups on the surface of the fibrous material. Thus, the isocyanate not only cures the silicone but also actually bonds it to the surface of the fibers by chemical bonds. This may account for the greater durability of the instant treatment on cotton than has heretofore been obtained.

The siloxanes which are useful in the method of this invention are copolymers of the above-defined hydroxylated siloxanes and conventional siloxanes. The relative proportions of the hydroxylated siloxane and the conventional siloxane may vary depending upon the properties desired in the finished coatings. In general, greater heat stability is obtained when small amounts of the hydroxylated siloxane is employed. On the other hand, faster curing and greater resistance to hydrocarbon solvents are obtained with higher amounts of the hydroxylated siloxane.

For the purpose of this invention R can be any divalent saturated aliphatic hydrocarbon radical of at least three carbon atoms such as propylene, butylene and octadecylene and any saturated cycloaliphatic divalent hydrocarbon radical of at least four carbon atoms such as

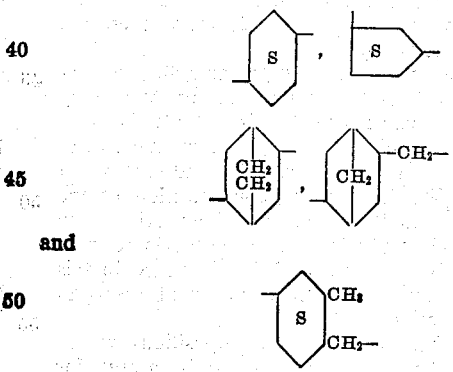

and

R′ is any saturated monovalent hydrocarbon radical free of aliphatic unsaturation such as alkyl radicals such as methyl, propyl, butyl and octadecyl; cycloaliphatic radicals such as cyclopentyl and cyclohexyl; aromatic hydrocarbon radicals such as phenyl, tolyl, naphthyl and xenyl; and alkaryl radicals such as benzyl and any halogenated monovalent hydrocarbon radical which is free of aliphatic unsaturation such as chlorophenyl, tetrafluoroethyl, α,α,α-trifluorotolyl and chlorotrifluorocyclobutyl. The symbol "S" has been used above to indicate that the ring systems within which it occurs are saturated cycloaliphatic radicals. In the process of this invention n may have a value from 0 to 2 so that the functional siloxane units can be of the formulae $HORSiO_{1.5}$, $HORR'SiO$ and $HORR'_2SiO_{.5}$ or any combination of these.

The siloxanes employed herein can be prepared in accordance with the method described in the copending application of John L. Speier, Serial No. 463,061, filed October 18, 1954.

The siloxanes employed in this invention also contain siloxane units of the formula $$R''_m SiO_{\frac{4-m}{2}}$$

in which R'' is any monovalent hydrocarbon radical such as alkyl radicals such as methyl, ethyl and octadecyl; alkenyl radicals such as vinyl, allyl and hexenyl; cycloaliphatic radicals such as cyclohexyl, cyclopentyl and cyclohexenyl; aryl hydrocarbon radicals such as phenyl, xenyl, tolyl and naphthyl and alkaryl hydrocarbon radicals such as benzyl. R'' can also be any halogenated monovalent hydrocarbon radical such as tetrafluoroethyl, bromophenyl, hexabromoxenyl, α,α,α-trifluorotolyl, trifluorovinyl, and tetrafluorocyclobutyl. In these siloxanes $m$ has an average value from 1 to 3 inclusive. Thus the siloxane can contain any combination of units of the formulae $R''SiO_{1.5}$, $R''_2SiO$ and $R''_3SiO_{.5}$ together with limited amounts of $SiO_2$ units. In the above formula when $m$ is 2 and R'' is methyl or hydrogen, the units can be defined as having the formula $(CH_3)_{2-x}H_xSiO$ where $x$ has a value of from 0 to 1 inclusive.

The compositions employed in this invention can be cured by employing any polyisocyanate, i.e., any isocyanate containing at least 2 isocyanate groups per molecule. Specific examples of isocyanates which are operative in this invention are aromatic isocyanates such as toluene-2,4-diisocyanate; 2-nitrodiphenyl-4,4'-diisocyanate; 2-nitrodiphenylmethane-4,4'-diisocyanate; diphenylmethanesulphone-4,4'-diisocyanate; diphenylsulphone-4,4'-diisocyanate; naphthylene-1,4-diisocyanate; naphthylene-1,5-diisocyanate; naphthylene-2,7-diisocyanate; fluorene-diisocyanate and chrysene-diisocyanate; and aliphatic isocyanates such as hexamethylene diisocyanate, butylene diisocyanate and octadecylene diisocyanate; and cycloaliphatic diisocyanates such as cyclohexylene diisocyanate and cyclopentylene diisocyanate. The isocyanates can be any of the above compounds in which there are 3 or more isocyanate groups.

In applying the compositions to organic fibrous materials it is preferable, for economic reasons, to employ solutions of the siloxane and the isocyanate in inert solvents such as aromatic hydrocarbon, aliphatic hydrocarbon, chlorinated hydrocarbon solvents and ethers. In general, it is preferable that the concentration of the solution be less than 10% and that the fabric be so treated that the pickup of siloxane on the fabric be from .2 to 5% by weight. Fabrics which are treated in this manner show no decrease in water repellency after several conventional launderings.

It has been found that certain compositions within the scope of this invention are not only useful for rendering organic fibrous materials water repellent but also give coatings when cured which are particularly resistant to hydrocarbon solvents. These compositions are therefore quite useful for protective coatings on other types of materials such as metals, glass, ceramic and organic plastic surfaces.

The compositions which have this particular utility are those having from 1 to 50 mol percent $$HORSiO_{\frac{3-n}{2}}^{R'_n}$$

50 to 99 mol percent $Me_2SiO$ and 0 to 35 mol percent $MeSiO_{1.5}$ in which compositions R, R' and $n$ are as above defined.

It is to be noted that these compositions can be cured by any conventional means, i.e., the curing of these compositions in order to get the solvent resistant coating is not restricted to the use of isocyanates. They can be cured by heat alone or by the use of siloxane bond rearranging catalysts or by the use of other organic polyfunctional materials which will react with hydroxyl groups such as dibasic acids. It is advantageous, however, to employ isocyanates as the curing agent since the cure proceeds more rapidly with these materials. In any event it is preferable to heat the resin at temperatures of 150 to 250° C. in order to insure proper curing.

These solvent resistant protective coatings may be applied to the base member in any desired manner such as by dipping, spraying, brushing or flooding. The coatings may also contain any desired pigment or fillers or other materials which are conventionally employed in connection with protective coatings.

The following examples are illustrative only and should not be construed as limiting the invention which is properly delineated in the appended claims. The symbols Me, Ac, Vi, and Et, are used throughout the specification and examples to represent methyl, acyl, vinyl and ethyl radicals respectively.

*Example 1*

A mixture of 195.6 g. of methyl hydrogen dichlorosilane and 64.6 g. of gamma-acetoxypropylmethyldichlorosilane was added with stirring to a mixture of 350 g. of toluene and 376 g. of water. After cohydrolysis was complete the copolymer solution was washed until neutral and the toluene solution was concentrated to 70% by weight siloxane.

95 g. of this 70% solution was diluted with 95 g. of toluene and 150 g. of methanol. A catalytic quantity of benzene sulphonic acid was added and the material allowed to stand at room temperature for 7 days. The solution was then washed with water and dried by azeotropic distillation until the weight of the solution reached 95 g. The resulting material was a solution of a copolymer of 15 mol percent gamma-hydroxypropylmethylsiloxane and 85 mol percent methyl hydrogen siloxane.

3 g. of the above solution and 1 g. of m-toluene diisocyanate were dissolved in 153 g. of toluene. A piece of cotton cloth was dipped into this solution then removed therefrom and air-dried. The cloth was water repellent and was found to have a pickup of 1.2% by weight of the combined silicone and diisocyanate. The cloth was laundered with soap and water and after laundering was found to be as water repellent as before laundering.

*Example 2*

The siloxane employed in this example was a copolymer of 55 mol percent phenylmethylsiloxane, 15 mol percent monophenylsiloxane, 15 mol percent monomethylsiloxane and 15 mol percent

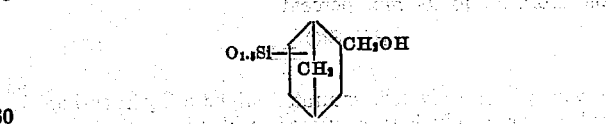

3.5 g. of this resin and 1 g. of m-toluene diisocyanate were dissolved in 219 g. of toluene to give a 2% solution of combined siloxane and isocyanate. A strip of cotton gauze was dipped into this solution and was removed therefrom and allowed to dry at 25° C. The gain in weight of the cloth was 4%. The cloth was water repellent as shown by the fact that it would support a drop of water 2 hours even after being crumpled. It was not completely wet upon immersion in water for several minutes. By contrast untreated gauze passed a droplet of water in a few seconds.

The treated cloth was washed with hand soap and water, rinsed and dried at 380° C. for 5 minutes. The gauze was still as water repellent as before.

The cloth was immersed and agitated in carbon tetrachloride for 5 minutes. The material was then removed and dried at 120° C. for 10 minutes and was found to be water repellent.

The toluene solution of siloxane and isocyanate remained effective after standing 16 days and was also found to render leather water repellent.

*Example 3*

The siloxane resin employed in this example was prepared as follows: A mixture of 64.5 g. of dimethyldichlorosilane, 52.3 g. of methyltrichlorosilane and 42.2 g. of

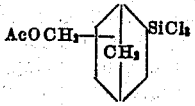

was added with stirring to a mixture of 218 g. of toluene and 100 ml. of water. As hydrolysis was complete the organic layer was washed until neutral, and azeotropically dried. One pellet of potassium hydroxide dissolved in 1 ml. of ethanol was added and the solution was refluxed for 6 hours at a concentration of 25% resin solids to remove all of the water. A slight excess of trimethylchlorosilane was added to neutralize the alkali and the solution was then concentrated to 70% solids in toluene.

This resin solution was then dissolved in a mixture of 10 g. of KOH, 50 g. of ethanol and 100 ml. of toluene. The solution was refluxed for 3 hours to saponify the acetoxy group. The resulting product was washed with water and neutralized with HCl. The resulting product was azeotropically dried and concentrated to 70% solution in toluene. The resulting siloxane resin had the following composition: 50 mol percent dimethylsiloxane, 35 mol percent monomethylsiloxane and 15 mol percent

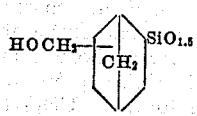

8.3 g. of this 70% toluene solution was mixed with .9 g. of m-toluene diisocyanate. A sheet of iron was coated with the solution and cured at 250° C. for 20 minutes giving a hard, tough, glossy, very flexible film. The resulting film was not attacked by toluene after 2½ hours of complete immersion.

2.3 g. of the above siloxane resin and 1 g. of m-toluene diisocyanate were dissolved in 163 g. of toluene. Cotton cloth was dipped into this solution, air dried for ½ hour and was found to be water repellent. The cloth remained as water repellent after vigorous washing with soap and water and after immersion in carbon tetrachloride.

*Example 4*

A siloxane resin having the composition 85 mol percent dimethylsiloxane and 15 mol percent HO(CH$_2$)$_3$SiO$_{1.5}$ (thus having an average of 1.85 silicon-bonded organic groups per silicon atom) was prepared in accordance with the general procedure of Example 3. 2.1 g. of this resin and 1 g. of m-toluene diisocyanate were dissolved in 150 g. of toluene. A piece of cotton cloth was dipped into the solution and air dried for 45 minutes. The pickup on the cloth was 2.1%. It retained its water repellency after washing with soap and hot water and after cleaning with carbon tetrachloride.

*Example 5*

Water repellent fabrics are obtained when rayon, paper, wood and nylon are treated in accordance with the procedure of Example 1.

*Example 6*

Water repellent cotton is obtained when a copolymer of 10 mol percent ViMeSiO, 20 mol percent ClC$_6$H$_4$SiO$_{1.5}$, 25 mol percent

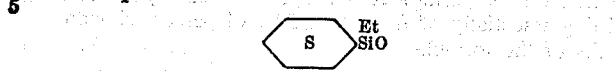

10 mol percent

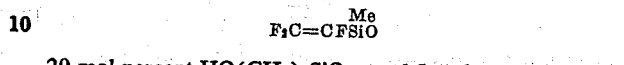

20 mol percent HO(CH$_2$)$_3$SiO$_{1.5}$ and 5 mol percent

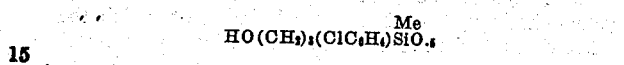

is applied in the manner of Example 1.

*Example 7*

89.2 g. of methyl hydrogen dichlorosilane and 30.2 g. Me$_2$Si[O(CH$_2$)$_3$SiCl$_2$Me]$_2$ were cohydrolyzed at 15 to 20° C. in sufficient toluene to make a 30% polymer solution and with enough water to result in a 30% aqueous HCl solution. The resulting copolymer had the formula 77.5 mol percent MeHSiO, 7.5 mol percent Me$_2$SiO and 15 mol percent $$\text{HO(CH}_2\text{)}_3\overset{\text{Me}}{\text{SiO}}$$

This material was neutralized by washing the organic layer with distilled water. 50 g. of diisopropylketone were added to the solution and the neutral resin was dried by azeotropic distillation, filtered and concentrated to 70% solids. Additional isopropylketone was added to keep the material in solution.

1.4 g. of the above resin and 1.1 g. of m-toluene diisocyanates were dissolved in 119 g. of the toluene. Cotton cloth was immersed in this solution for about 1 minute and air dried 20 minutes at room temperature. The cloth was then heated at 150° C. for 20 minutes. The resulting cloth was water repellent and remained so after washing with Lava soap and water. The cloth was also water repellent after dry-cleaning with carbon tetrachloride.

That which is claimed is:

1. A method of rendering an organic fibrous material water repellent which comprises applying to the fibrous material a solution in an inert organic solvent of a composition comprising (1) a copolymer consisting essentially of from 1 to 50 mol percent siloxane units of the formula

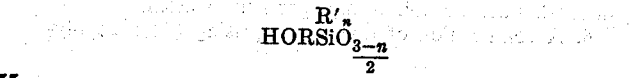

in which R is of the group consisting of divalent saturated aliphatic hydrocarbon radicals and divalent saturated cycloaliphatic hydrocarbon radicals in all of which the hydroxyl is attached to a carbon atom which is no closer than the third carbon atom from the silicon, R' is of the group consisting of monovalent hydrocarbon radicals and halogenated monovalent hydrocarbon radicals, all of which are free of aliphatic unsaturation and n has an average value from 0 to 1 inclusive and from 50 to 99 mol percent siloxane units of the formula R$_2$SiO in which R'' is of the group consisting of monovalent hydrocarbon radicals, halogenated monovalent hydrocarbon radicals and hydrogen, there being not more than one hydrogen atom attached to any one silicon atom, and said copolymer having an average of at least 1.85 silicon-bonded organic groups plus silicon-bonded hydrogen atoms per silicon atom, and (2) an organopolyisocyanate in which the isocyanate substituents are the only substituents present which are reactive in the system, and thereafter allowing the composition to dry.

2. An organic fibrous material treated by the method of claim 1.

3. A method of rendering a cellulosic fibrous material water repellent which comprises applying to the fibrous material a composition comprising (1) a copolymer consisting essentially of from 1 to 50 mol percent siloxane units of the formula $$HORSiO_{\frac{3-n}{2}}^{R'_n}$$

in which R is of the group consisting of divalent saturated aliphatic hydrocarbon radicals and divalent saturated cycloaliphatic hydrocarbon radicals in all of which the hydroxyl is attached to a carbon atom which is no closer than the third carbon atom from the silicon, R' is of the group consisting of monovalent hydrocarbon radicals and halogenated monovalent hydrocarbon radicals all of which are free of aliphatic unsaturation and $n$ has an average value from 0 to 1 inclusive and from 50 to 99 mol percent siloxane units of the formula $R_2SiO$ in which R'' is of the group consisting of monovalent hydrocarbon radicals, halogenated monovalent hydrocarbon radicals and hydrogen, there being not more than one hydrogen atom attached to any one silicon atom, and said copolymer having an average of at least 1.85 silicon-bonded organic groups plus silicon-bonded hydrogen atoms per silicon atom, and (2) an organopolyisocyanate in which the isocyanate substituents are the only substituents present which are reactive in the system, and thereafter allowing the composition to dry.

4. A cellulosic fibrous material treated in accordance with the method of claim 3.

5. A composition of matter comprising a copolymeric organopolysiloxane consisting of from 1 to 50 mol percent siloxane units of the formula $$HORSiO_{\frac{3-n}{2}}^{R'_n}$$

in which R is of the group consisting of divalent saturated aliphatic hydrocarbon radicals and divalent saturated cycloaliphatic hydrocarbon radicals in all of which the hydroxyl is attached to a carbon atom which is no closer than the third carbon atom away from the silicon, R' is of the group consisting of monovalent hydrocarbon radicals and halogenated monovalent hydrocarbon radicals all of which are free of aliphatic unsaturation and $n$ has a value from 0 to 1 inclusive, and from 50 to 99 mol percent dimethylsiloxane units said copolymeric organopolysiloxane having an average of at least 1.85 silicon-bonded organic groups per silicon atom.

6. A composition of matter comprising (1) a copolymeric organopolysiloxane consisting essentially of from 1 to 50 mol percent siloxane units of the formula $$HORSiO_{\frac{3-n}{2}}^{R'_n}$$

in which R is of the group consisting of divalent saturated aliphatic hydrocarbon radicals and divalent saturated cycloaliphatic hydrocarbon radicals in all of which the hydroxyl is attached to a carbon atom which is no closer than the third carbon atom away from the silicon, R' is of the group consisting of monovalent hydrocarbon radcials and halogenated monovalent hydrocarbon radicals all of which are free of aliphatic unsaturation and $n$ has an average value from 0 to 1 inclusive, and from 50 to 99 mol percent dimethylsiloxane units, said copolymeric organopolysiloxane having an average of at least 1.85 silicon-bonded organic groups per silicon atom, and (2) an organopolyisocyanate in which the isocyanate substituents are the only substituents present which are reactive in the system.

7. A method in accordance with claim 3 in which R is a n-propylene radical, R' is a methyl radical, and R''$_2$SiO represents a methylhydrogensiloxane unit.

8. A method of rendering a cellulosic fibrous material water repellent which comprises applying thereto a solution in an inert organic solvent of (1) a copolymer of from 1 to 50 mol percent siloxane units of the formula $HOCH_2CH_2CH_2(CH_3)SiO$ and from 50 to 99 mol percent siloxane units of the formula $(CH_3)_2SiO$, and (2) toluene diisocyanate, and thereafter drying said cellulosic material.

9. A composition of matter consisting essentially of a solution in an inert organic solvent of (1) a copolymer of from 1 to 50 mol percent siloxane units of the formula $HOCH_2CH_2CH_2(CH_3)SiO$ and 50 to 99 mol percent siloxane units of the formula $(CH_3)_{2-x}H_xSiO$ where $x$ has an average value of from 0 to 1 inclusive, and (2) toluene diisocyanate.

10. A composition of matter consisting essentially of a solution in an inert organic solvent of (1) a copolymer of from 1 to 50 mol percent siloxane units of the formula $HOCH_2CH_2CH_2(CH_3)SiO$ and 50 to 99 mol percent siloxane units of the formula $(CH_3)HSiO$, and (2) toluene diisocyanate.

References Cited in the file of this patent
UNITED STATES PATENTS 2,550,205  Speier _____ Apr. 24, 1951

OTHER REFERENCES

Speier: J.A.C.S., vol. 74, No. 4, Feb. 20, 1952, pages 1003–1010. (Copy in Scientific Library.)

UNITED STATES PATENT OFFICE

CERTIFICATE OF CORRECTION

Patent No. 2,924,587            February 9, 1960

Leonard M. Shorr

It is hereby certified that error appears in the printed specification of the above numbered patent requiring correction and that the said Letters Patent should read as corrected below.

Column 6, line 66, for "$R_2SiO$" read -- $R''_2SiO$ --; column 7, line 5, after "material" insert -- a solution in an inert organic solvent of"; line 21, for "$R_2SiO$" read -- $R''_2SiO$ --.

Signed and sealed this 2nd day of August 1960.

(SEAL)
Attest:
KARL H. AXLINE
Attesting Officer

ROBERT C. WATSON
Commissioner of Patents